Dec. 25, 1951          A. H. EMERY          2,580,009
ADAPTER FOR SNAP GAUGES
Filed Oct. 28, 1949
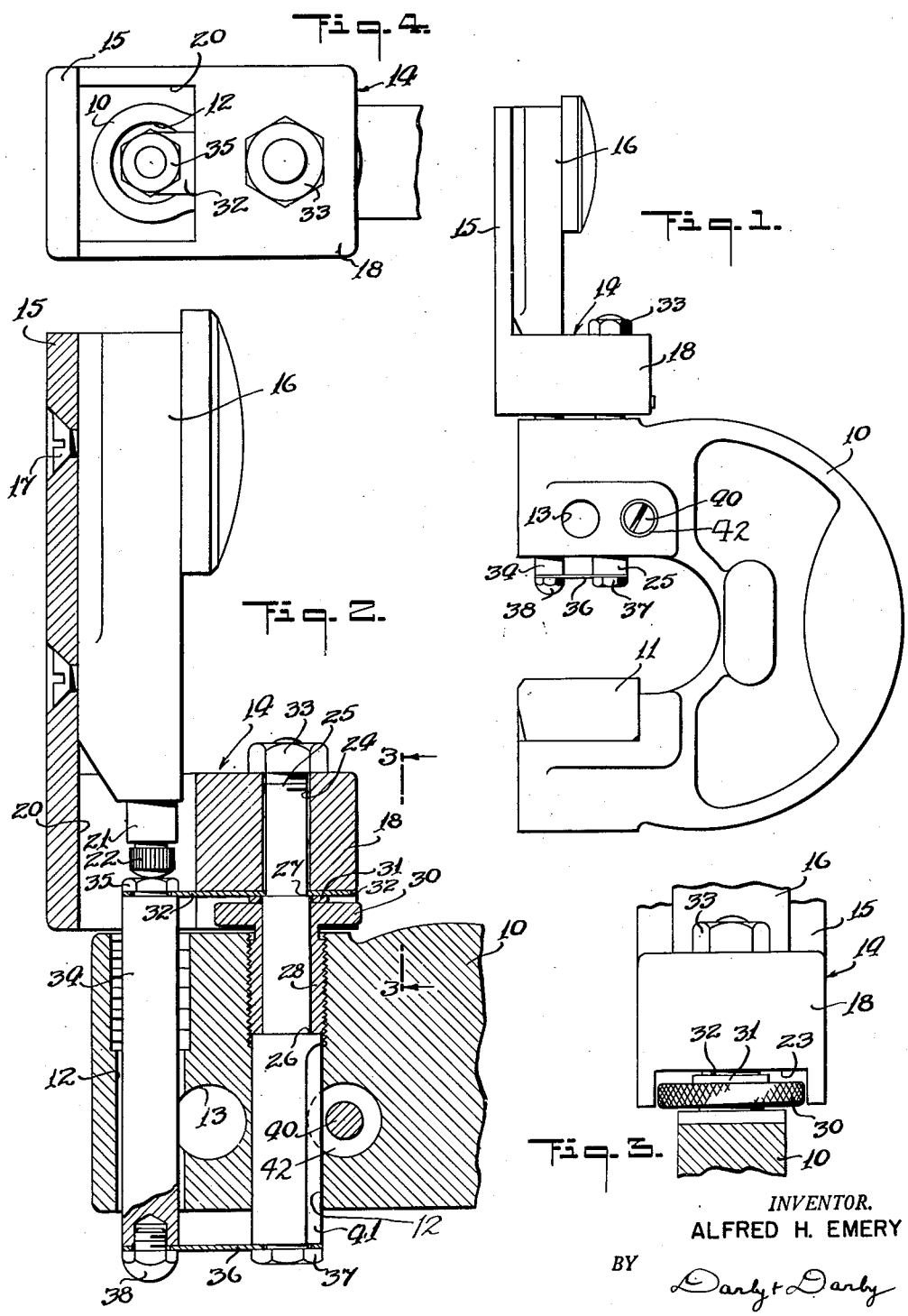
INVENTOR.
ALFRED H. EMERY
BY
Darby & Darby
ATTORNEYS Patented Dec. 25, 1951

2,580,009

UNITED STATES PATENT OFFICE 2,580,009

ADAPTER FOR SNAP GAUGES

Alfred H. Emery, Poughkeepsie, N. Y., assignor to Standard Gage Company, Inc., Poughkeepsie, N. Y., a corporation of New York Application October 28, 1949, Serial No. 124,092

5 Claims. (Cl. 33—147)

The present invention relates to adapters for snap gages and particularly to an adapter or converter to be used with an adjustable limit snap gage in order to convert that gage to a dial snap gage of the comparator type.

Adjustable limit snap gages of the type which are converted by my invention to dial snap gage operation comprise an anvil and a pair of co-operating gaging pins which pins are set to the tolerance limits desired and locked in set position in a well-known manner.

The present invention contemplates the removal of the two gaging pins and the utilization of the partially threaded bores in which these pins are normally positioned to position the adapter of the present invention, the adapter including provision for the mounting of a dial indicator so that the movement of the adapter plunger is transmitted to the indicator plunger and is effective to produce a reading on the dial.

It is an object of my invention to provide an adapter whereby an adjustable limit snap gage may be converted to a dial snap gage of the comparator type.

It is another object of my invention to provide such an adapter including a bracket on which may be mounted any one of a number of types of dial indicator gages.

It is another object of my invention to provide such an adapter which may be mounted on the snap gage without any modification of that gage, the adapter being positioned by utilization of the partially threaded bores in which the gaging pins are normally positioned and held.

Other objects and features of the invention will appear when the following description is considered in connection with the appended drawings, in which—

Figure 1 is a side elevation of an adjustable limit snap gage with my adapter positioned thereon, the adapter being shown as carrying a small dial indicator gage of the type known as the universal midget indicator (see Emery Patent No. 2,226,756, issued December 31, 1940);

Figure 2 is a fragmentary cross-sectional view of the gage of Figure 1 showing particularly the mode of mounting the adapter of my invention in the frame of the adjustable limit snap gage;

Figure 3 is a fragmentary cross-sectional view taken on the plane of the line 3—3 of Figure 2 showing particularly the construction of and adjustment means for the adapter; and Figure 4 is a fragmentary top plan view of the gage of Figure 1 with my converter mounted thereon. In this figure the dial indicator gage is omitted.

Referring now to the drawings, there is shown a common form of adjustable limit snap gage comprising a generally U-shaped frame 10 having a gaging anvil 11 mounted at the extremity of one arm thereof. In normal usage gaging pins are mounted at the extremity of the other arm being located in the bores 12 (Figure 2) and being locked in position by means of screws and clamping members which are normally placed in the holes 13.

As has been indicated above, the gaging pins are removed from the structure in order to utilize my adapter and are therefore not shown in the drawings. My adapter or converter comprises a bracket 14 having an upwardly extending portion or arm 15, on which a dial indicator 16 is mounted in any suitable manner such for example as by means of the screws 17. The horizontal arm 18 of bracket 14 is provided with a rectangular opening 20 adjacent its left end and adjacent the vertical arms 15 (Figs. 2 and 4) into which extends the lower portion of the housing together with the measuring plunger 21 and measuring button 22 of the gage 16.

The horizontal arm 18 of bracket 14 is grooved along its lower face as shown at 23, Figure 3, to provide a space for an adjustment nut hereafter described, and to likewise provide a surface against which a plunger supporting reed bears.

The arm 18 is provided with a hole 24 in which a shouldered pin 25 is mounted. Specifically, the pin 25 is shouldered at points 26 and 27 and is assembled into the hole or bore 24 after an externally threaded bushing 28 having an integral knurled portion 30 has been slipped over the pin 25 and after a washer 31 and reed 32 have likewise been assembled on the pin 25 with the reed 32 resting on the shoulder 27. In order to hold the parts just mentioned in position, a nut 33 is threaded onto the end of the pin 25.

The device is completed by fastening a measuring plunger 34 to the reed 32, this being done by inserting a screw 35 through an aperture in the reed 32 and into a tapped hole in the plunger 34. In addition, a second reed 36 is assembled on the lower end of pin 25 by means of a screw 37 and is likewise fastened to the lower end of measuring plunger 34 by means of the screw 38 which screw is provided with a hardened hemispherical head since it is to make contact with the article to be measured.

In order to position the adapter on the gage and in the position shown particularly in Figure 2, the procedure is as follows: The screws 37 and 38 are removed and the reed 36 thereby freed and removed. The entire adapter is then placed into position with pin 25 extending into the right hand one of the bores 12 and measuring plunger 34 extending into the left hand one of the bores 12. The knurled portion 30 is then utilized to rotate the bushing 28 thereby threading the bushing into the right hand one of the bores 12 and adjusting the height of the adapter to a desired position depending on the dimension of the article to be gaged. It will be clear that the pin 25 is held against rotation due to the clamping action of the nut 33 which holds the reed 32 and horizontal arm 18 firmly between the shoulder 27 and the undersurface of the nut.

Thus when the bushing 28 is rotated, it serves only to adjust the vertical position of the adapter, verticality being accurately maintained through a close fit of the portion of the pin intermediate the shoulders 26 and 27 with the interior of the bushing 28 as well as because of an accurately flat surface of the underside of the hardened washer 31 and the upper surface of the bushing 28.

When the device has been inserted as described, the reed 36 together with screws 37 and 38, are replaced and the operating plunger 34 thus supported for movement parallel to its axis. It should be noted that the operating plunger 34 extends freely through the bore 12 making no contact with the walls of that bore.

After the device has been assembled, accurate adjustment may be made by means of a knurled portion 30 of the bushing 28 and when the adjustment is that desired, the device is clamped into its adjusted position by tightening the screw 40 which has a pair of clamping members 42, one at either end thereof, adapted to clamp a flattened portion 41 of the pin 24 therebetween.

The foregoing has described the mounting of the bracket in a position such that the dial indicator 16 can best be read when the operator is facing the closed end of the frame 10 of the snap gage.

If it is desirable to position the gage 10 so that it may be read by a user who is facing the open end of the snap gage 10 this can readily be accomplished by assembling the bushing 28 in the left hand one of the two bores 12 with the plunger 34 extending freely through the right hand opening. This is true because of the fact that the gaging anvil extends laterally sufficiently far to cooperate with the gaging element 38 whether it is located in the left or right hand one of the two bores 12.

While I have described a preferred form of my invention, it will be understood that other modifications may be made within the scope of the invention and I wish therefore to be limited not by the foregoing description, but on the contrary solely by the claims granted to me.

What is claimed is:

1. An adapter for an adjustable limit snap gage of the type having a U-shaped frame, an anvil mounted in the extremity of one of the arms of the frame and a pair of separated gaging pin mounting bores in the other arm of the frame, said adapter comprising, in combination, a bracket, means for adjustably supporting said bracket from one of the gaging pin bores, an operating plunger extending through the second of said gaging pin bores, and means for supporting said operating plunger on said bracket.

2. An adapter for an adjustable limit snap gage of the type having a U-shaped frame, an anvil mounted in the extremity of one of the arms of the frame and a pair of separated gaging pin mounting bores in the other arm of the frame, said adapter comprising, in combination a threaded bushing adjustably positioned in one of the gaging pin bores, a supporting pin mounted in said bushing and extending on either side of the frame arm, an operating plunger extending through the second of the gaging pin bores and means supported on said supporting pin for supporting said operating plunger while permitting limited movement with respect to said supporting pin and parallel to the axis thereof.

3. An adapter for an adjustable limit snap gage of the type having a U-shaped frame, an anvil mounted in the extremity of one of the arms of the frame and a pair of gaging pin mounting bores in the other arm of the frame, said adapter comprising, in combination, a threaded bushing adapted to be adjustably positioned in one of the gaging pin bores, a supporting pin mounted in said bushing and extending on either side of the frame arm, an operating plunger extending through the second of the gaging pin bores, means supported on said supporting pin and supporting said operating plunger while permitting limited movement parallel to the axis thereof, said operating plunger having a measuring button at its inner end, and a dial indicator supported from said pin and having its measuring element in contact with the outer end of said operating plunger.

4. An adapter for an adjustable limit snap gage of the type having a U-shaped frame, an anvil mounted in the extremity of one of the arms of the frame and a pair of gaging pin mounting bores in the other arm of the frame, said adapter comprising, in combination, a bracket, a pin extending from said bracket and fixed thereto, means for adjustably positioning said pin in one of the gaging pin bores, a pair of reeds rigidly supported on said pin at opposite sides of the frame arm, said reeds extending across the second of the gaging pin bores and an operating plunger supported by said reeds for movement parallel to its axis, said operating plunger extending through the second of said gaging pin bores.

5. An adapter for an adjustable limit snap gage of the type having a U-shaped frame, an anvil mounted in the extremity of one of the arms of the frame and a pair of gaging pin mounting bores in the other arm of the frame, said adapter comprising, in combination, a bracket having two arms extending at right angles to each other, one arm of said bracket having an aperture therethrough adjacent the other arm, means for positioning an indicator on one arm of said bracket with its measuring plunger extending into said aperture, a pin extending from the apertured arm of said bracket and fixed to said bracket, an externally threaded bushing mounted on said pin, said bushing being threadedly mounted in one of the gaging pin bores, a pair of reeds rigidly supported on said pin at opposite sides of the frame arm, said reeds extending across the second of the gaging pin bores and an operating plunger supported by said reeds for movement parallel to its axis, said operating plunger extending freely through the second of said gaging pin bores and making contact with said indicator measuring plunger within the aperture of said bracket arm.

ALFRED H. EMERY.

REFERENCES CITED

The following references are of record in the file of this patent:

UNITED STATES PATENTS

| Number | Name | Date |
|---|---|---|
| 1,664,583 | Wheelock | Apr. 3, 1928 |

FOREIGN PATENTS

| Number | Country | Date |
|---|---|---|
| 240,633 | Switzerland | May 1, 1946 |